(12) United States Patent
Chanduri et al.

(10) Patent No.: US 12,083,675 B2
(45) Date of Patent: Sep. 10, 2024

(54) COLLABORATIVE ROBOT (COBOT) ASSISTANCE

(71) Applicant: NCR Voyix Corporation, Atlanta, GA (US)

(72) Inventors: Anand Chanduri, Hyderabad (IN); Jamal Mohiuddin Mohammad, Karimnagar (IN)

(73) Assignee: NCR Voyix Corporation, Atlanta, GA (US)

( * ) Notice: Subject to any disclaimer, the term of this patent is extended or adjusted under 35 U.S.C. 154(b) by 710 days.

(21) Appl. No.: 16/660,240

(22) Filed: Oct. 22, 2019

(65) Prior Publication Data
US 2021/0114239 A1    Apr. 22, 2021

(51) Int. Cl.
*G06F 7/00* (2006.01)
*B25J 9/16* (2006.01)
*B25J 11/00* (2006.01)
*B25J 19/02* (2006.01)
*G06Q 10/087* (2023.01)

(52) U.S. Cl.
CPC .......... *B25J 19/023* (2013.01); *B25J 9/1661* (2013.01); *B25J 11/0005* (2013.01); *B25J 11/008* (2013.01); *B25J 19/026* (2013.01); *G06Q 10/087* (2013.01)

(58) Field of Classification Search
CPC .... B25J 19/023; B25J 9/1661; B25J 11/0005; B25J 11/008; B25J 19/026; B25J 5/007; B25J 9/0087; B25J 9/1679; G06Q 10/087; G05D 2201/0211; G05D 1/0246
USPC .......................... 700/213–214, 245, 258–259
See application file for complete search history.

(56) References Cited

U.S. PATENT DOCUMENTS

| | | | |
|---|---|---|---|
| 2019/0206400 A1* | 7/2019 | Cui | B25J 9/1697 |
| 2019/0392506 A1* | 12/2019 | Bogolea | G06Q 30/0633 |
| 2020/0184542 A1* | 6/2020 | Welty | G06Q 30/0224 |
| 2020/0310391 A1* | 10/2020 | Cole | B25J 9/1674 |
| 2021/0046650 A1* | 2/2021 | Deyle | G05D 1/0214 |

* cited by examiner

*Primary Examiner* — Yolanda R Cumbess
(74) *Attorney, Agent, or Firm* — Schwegman Lundberg & Woessner, P.A.

(57) ABSTRACT

Real-time images of individuals and items on shelves of a store are analyzed for behaviors of the individuals and stocking levels of the items on the shelves. An autonomous Collaborative Robot (COBOT) is dispatched to aid the individuals based on the behaviors. The COBOT also restocks the shelves with the items when the stocking levels fall below predefined thresholds. The COBOT may be dispatched remotely or activated autonomously based on the behaviors or the stocking levels. In an embodiment, the COBOT aids individuals by retrieving items from shelves that are unable to be reached by the individuals.

18 Claims, 5 Drawing Sheets

COLLABORATIVE ROBOT (COBOT) ASSISTANCE

BACKGROUND

Advancements in technology have permitted a wide-range of new services to consumers. One particular advancement is the deployment of frictionless stores. In a frictionless store, a consumer checks in through automated mechanism or is automatically identified upon entry into the store through facial recognition. The consumer then picks items from the shelves and places them in a bag, basket, or cart. The consumer then exits the store. There is no requirement of any interaction with staff of the store. Images captured of the consumer and the items allow the store to automatically identify what was purchased and charge a registered account associated with the consumer.

However, there are a variety of situations where consumers may need some real assistance from real staff. For example, consumers may not be able to locate desired items or consumers may be unable to reach desired items that are located on shelving that the consumers cannot reach. Existing frictionless stores fail to adequately address these issues.

Additionally, the stores of the shelves within a frictionless store still require store-staff to stock items on the shelves. Usually, this activity is scheduled at particular times of the day or on particular days of the week. Yet, when a particular item is being sold in unusually high quantities, the shelves having the items can become depleted. As a result, consumers looking for the item are unable to locate and purchase the item. The store in these situations loses revenue and the consumers become frustrated because of the lack of availability of an item that the consumers may have came specifically to the store to purchase. These frustrated consumers may not return to the store, resulting in further loses to the store.

Therefore, because there are a variety of activities that still require physical store staff to perform those activities within a frictionless store, acceptance and operation of frictionless stores remain problematic in the industry.

SUMMARY

In various embodiments, methods and a system for Collaborative Robot (COBOT) assistance within a store are presented.

According to an aspect, a method for COBOT assistance within a store is presented. A COBOT self-navigates from an existing location of the COBOT to a destination location based on a condition detected at the destination location. The COBOT performs a task at the destination location to resolve the condition.

DETAILED DESCRIPTION

Figure 1A:
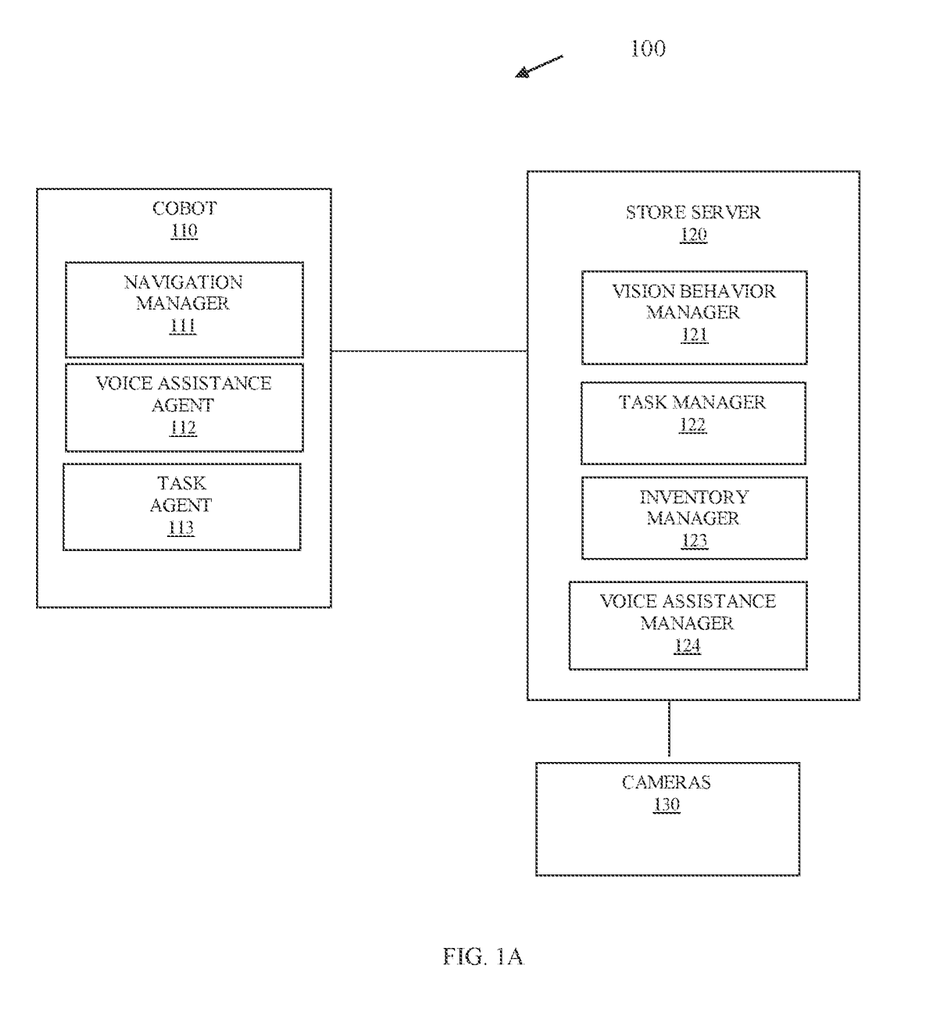
FIG. 1A is a diagram of a system for COBOT assistance, according to an example embodiment.

FIG. 1A is a diagram of a system 100 for COBOT assistance, according to an example embodiment. It is to be noted that the components are shown schematically in greatly simplified form, with only those components relevant to understanding of the embodiments being illustrated.

Furthermore, the various components (that are identified in the FIG. 1A) are illustrated and the arrangement of the components is presented for purposes of illustration only. It is to be noted that other arrangements with more or less components are possible without departing from the teachings of COBOT assistance presented herein and below.

The system 100 includes a COBOT 110, a store server 120, and a plurality of cameras 130. The COBOT 110 and store server 120 include their own processors and non-transitory computer-readable storage media comprising executable instructions representing: navigation manager 111, voice-assistance agent 112, task agent 113, vision behavior manager 121, task manager 122, inventory manager 123, and voice-assistance manager 124. The executable instructions when executed by the processors perform the processing discussed herein and below with respect to navigation manager 111, voice-assistance agent 112, task agent 113, vision behavior manager 121, task manager 122, inventory manager 123, and voice-assistance manager 124.

It is noted that although a single COBOT 110 is illustrated that this is done for illustration as a single store may deploy multiple independent COBOTs 110, each COBOT responsible for a predefined set of aisles, shelves, and/or locations within the store.

The system 100 is deployed within a physical store. The store may be a frictionless store, a traditional store equipped with cameras 130, or a traditional store that includes frictionless store portions or aspects.

Navigation manager 111 provides physical navigation instructions to COBOT 111, which cause mechanical wheels of COBOT 111 to physically move about the store from initial or starting locations to destination locations.

Voice-assistance agent 112 provides a voice-to-text and text-to-voice interface between a customer of the store and the COBOT 110. That is, spoken voice of a customer is translated into text and provided through a network-connection of the COBOT 110 to voice-assistance manager 124. Voice-assistance manager 124 uses a knowledge store to process the text and return a text response to the voice-assistance agent 112. Voice-assistance agent 112 converts the text response provided by manager 124 and provides speech output through speakers of COBOT 110 to the consumer (as used herein the terms "consumer" and "customer" may be used interchangeably and synonymously).

In an embodiment, the voice-assistance agent 112 is a modified version of an existing Amazon Echo®, Google Home®, Apple Siri® that is customized for a knowledge database of the store. In this embodiment, the network-based voice-assistance manager 124 may be provided over an Internet connection from a cloud; rather than from server 120.

Although not depicted in FIG. 1A, COBOT 110 may also include a user-facing text and graphical-based interface, such that a customer may use touch input on a display screen of COBOT 110 to obtain in-store assistance.

Task agent 113 provides instructions for performing a task, which cases mechanical arms of COBOT 110 to extend, retrack, grasp items, and wheels to cause COBOT 110 to physically move from location to location. The tasks are defined by task manager 122 of server 120. A task can include obtaining an item off a given shelf of the store for a customer, handing an item to the customer, independently asking through voice whether a customer requires any assistance, or more complex steps such as restocking an item type with items from a stocking area of the store onto a given shelf of the store.

COBOT 110 also includes a variety of sensors for audio, motion, and image (cameras). These sensors provide input that may be processed on COBOT 110 to identify an independently generated task for the COBOT to perform or may be sent over a wireless network connection to server 120 for server 120 to identify and generate a task for the COBOT 110 to perform as defined by task manager 122. The sensor input may also be processed by COBOT 110 to physically navigate obstacles within the store and obtain and move items during any task being performed.

Vision behavior manager 121 receives real-time images from cameras 130 situated through the store. The images are used by manager 121 to track customers, track items within the store, track COBOT 110, and identify behaviors of customers within the store.

The behaviors and tracking are processed using rules by the task manager 122 to identify tasks that manager 122 sends over a wireless connection to task agent 113.

Inventory manager 123 maintains an inventory of item types and corresponding items available within the store and is consulted by task manager 122 to determine when item inventory is available, the location within the store of the item inventory, and in some cases item shelf capacity for any given item.

During operation, vision behavior manager 121 identifies when a customer is engaged in a predefined behavior, such as standing in one place and staring at a shelf, attempting to reach for a shelf, returning to an aisle or a shelf multiple times without making any item selection, etc. The predefined behaviors are provided to task manager 122. Task manager 122 uses rules that match to the behaviors to generate a task for COBOT 110, such as customer needs assistance in aisle X obtaining item Y from shelf Z. An obtain-item-from-shelf task is generated and wirelessly sent to task agent 113. Task agent 113 consults navigation manager 111 to generate a route from a current location within the store to aisle X wherein item Y and shelf Z are located. The navigation manager 111 activates the wheels of COBOT 110 and causes COBOT 110 to travel in accordance with the planned route to the destination location within the store. Once at the destination location, task agent 113 causes arms and grips of COBOT 110 to activate and move to obtain item Y from shelf Z, retrack the arms, identify the customer, and loosen the grips, and extend the arm with item Y toward customer for the customer to take the item. Voice assistance agent 112 may also activate and speak through speakers the item name and request that the customer take the item from the grips. Voice assistance agent 112 may also be activated by voice input of the customer, such as the customer stating I did not want item Y but instead wanted item C, in response voice assistant agent 112 converts the request to text and processes the request to identify a location of item C and generates a task via task agent 113 for COBOT 110 to return item Y to shelf Z, retrieve item C from its shelf location, and again extend and hand item C to the customer.

The above-noted example is one of many that COBOT 110 can perform and is intended to be illustrative as other tasks and interactions between COBOT 110 and a customer may be achieved as well, such as COBOT 110 approaching a customer and asking whether any item assistance is needed and then providing the item assistance either through retrieval of the item or through voice instructions on where the customer may obtain the item within the store.

In addition to real-time autonomous customer item assistance, COBOT 110 may perform item shelf restocking. This may be scheduled restocking determined by inventory manager 123 and task manager 122 or may be unscheduled item shelf restocking identified independently by COBOT 110 and/or task manager 122 in connection with images of shelves processed by vision behavior manager 121 and determined necessary based on rules by task manager 122. In one case, COBOT 110 may scan item inventories on shelves and send the real-time images as input to the vision behavior manager 121 or task manager 122, with a resulting decision to restock certain shelves made with particular items in a task sent by task manager 122 to task agent 113.

In an embodiment, a camera or cameras of COBOT 110 may be remotely monitored by personnel of the store and tasks provided through an interface to the task manager 122 by the personnel.

In an embodiment, the personnel may use the speakers and cameras of COBOT 110 to directly engage a customer in a conversation.

In an embodiment, the personnel may remotely control and navigate COBOT 110 throughout the store and identify tasks for COBOT 110 to perform.

In an embodiment, a customer may display an item on his/her phone that the customer desires to a camera of COBOT 110 and through interaction with task manager 122 and task agent 113, COBOT 110 traverses the store, obtains the item, and provided to the customer.

In an embodiment, a barcode may be scanned within a mobile application of a mobile device of the customer to manually summons the COBOT 110 to come to the customer and provide assistance. In an embodiment, the barcode may be displayed on aisle shelving of the store and identify the COBOT 110. In an embodiment, the mobile application includes an option for the customer to manually summons COBOT 110.

In an embodiment, the customer may scan a shelf barcode for an item and present an image of the barcode from customer's mobile phone display to a camera of COBOT 110 and COBOT 110 extends, obtains, and hands the corresponding item that matches the barcode to the customer.

In an embodiment, COBOT 110 performs item shelf restocking through manually initiated tasks sent from store personnel.

In an embodiment, COBOT 110 performs item shelf restocking at predefined schedules provided from store personnel.

In an embodiment COBOT 110 autonomously performs item shelf restocking.

In an embodiment COBOT 110 performs item shelf restocking upon a corresponding task sent from task manager 122.

In an embodiment, COBOT 110 presents a Graphical User Interface on a touch display of COBOT 110 for interaction by a customer or for receiving a task from a customer.

In an embodiment, COBOT 110 receives tasks to perform on behalf of a customer through a mobile application on a mobile phone of the customer that is interfaced to server 120, server 120 then providing the customer-defined task to COBOT 110 for performing.

In an embodiment, the store includes one COBOT 110 per aisle of the store, one COBOT 110 per shelf, one COBOT 110 per sets of aisles or shelves, or one COBOT 110 for the whole store.

In an embodiment, navigation manager 111 and sensors of COBOT 110 are configured to include the COBOT 110 riding an escalator within the store to reach a destination location or accessing and riding an elevator to reach a destination location.

In an embodiment, COBOT 110 is configured to return to a charging location and a charger when battery power for COBOT 110 drops below a predefined threshold level of battery power.

Figure 1B:
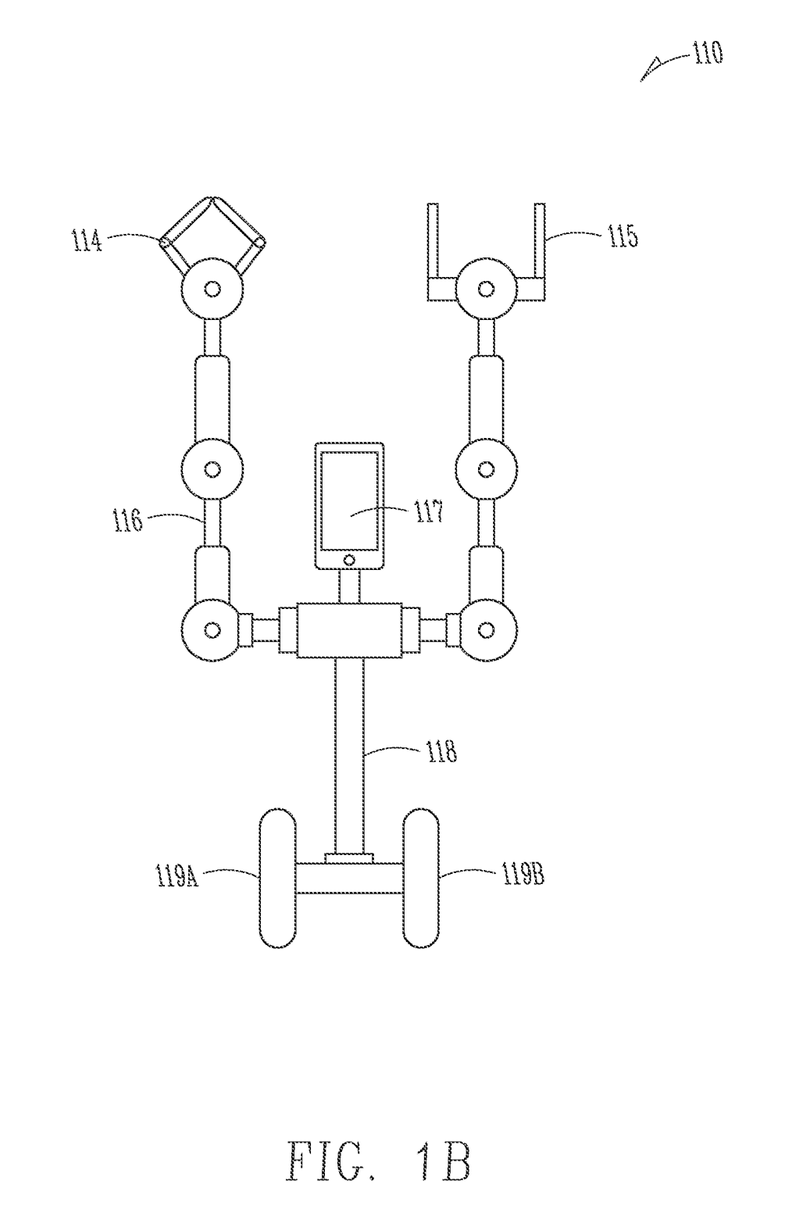
FIG. 1B is a diagram of a COBOT, according to an example embodiment.

FIG. 1B illustrates an example COBOT 110, according to an example embodiment. COBOT 110 includes two different types grippers 114 and 115, arms 116, a display interface 117 (which may also include an integrated camera), a body shaft 118, and two wheels 119A and 119B.

Gripper 114 permits picking of items or moving items or smaller sizes. Gripper 115 is capable of handling picking of items or moving of item of larger sizes. Display interface 117 may be a tablet computer having a touch interface, speakers, microphone, and camera. Body shaft 118 is a hydraulic lift that can extend in height to 6 feet or more. Arms 116 are capable of turning, extending, and moving in 360 degrees with any orientation. Wheels 119A and 119B allow COBOT 110 to move about the store.

In an embodiment, COBOT 110 includes three wheels with arranged in a triangle for stability of COBOT 110.

It is noted that other arrangements of the components of COBOT 110 may be used without departing from the teachings provided herein, such as three arms, a box shape that extends upward and contracts back into a box, etc.

These and other embodiments will now be discussed with references to the FIGS. 2-4.

Figure 2:
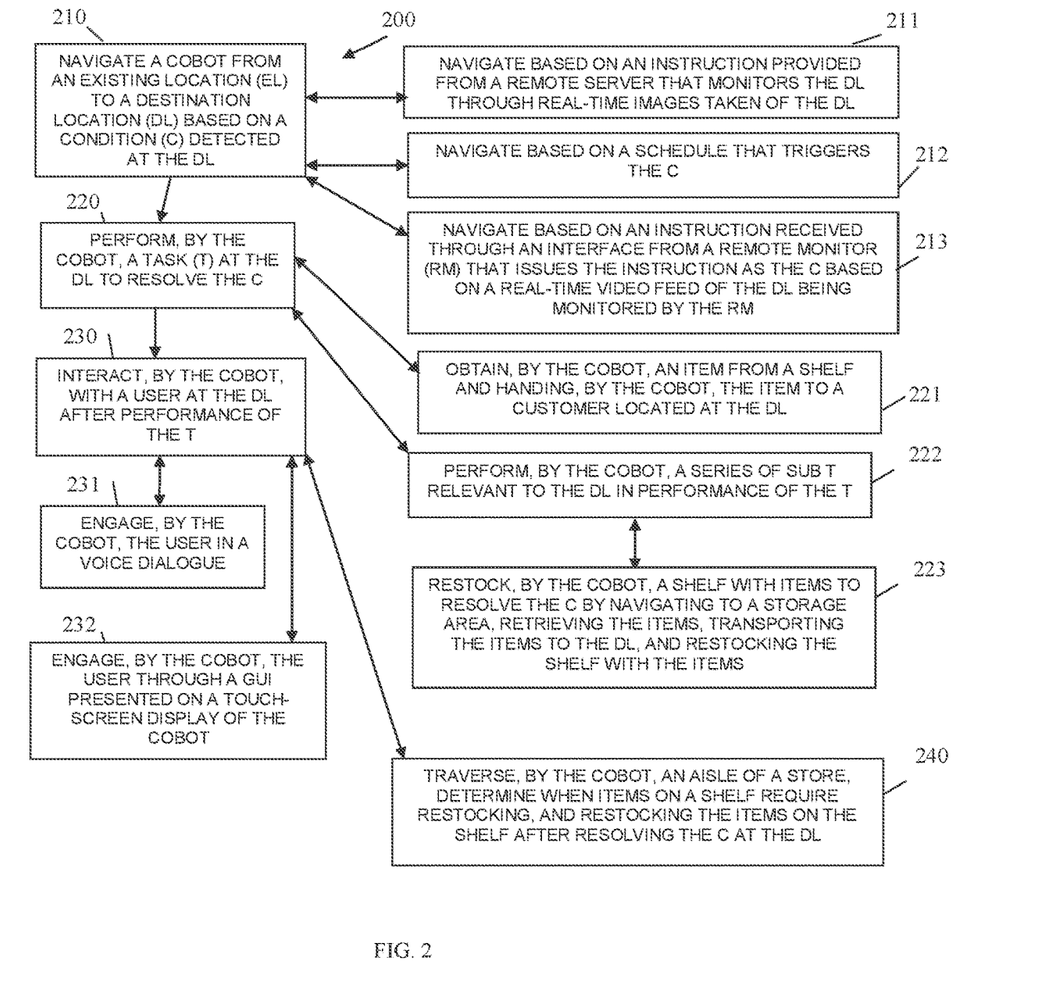
FIG. 2 is a diagram of a method for COBOT assistance, according to an example embodiment.

FIG. 2 is a diagram of a method 200 for COBOT assistance, according to an example embodiment. The software module(s) that implements the method 200 is referred to as an "assistance COBOT." The assistance COBOT is implemented as executable instructions programmed and residing within memory and/or a non-transitory computer-readable (processor-readable) storage medium and executed by one or more processors of a device. The processor(s) of the device that executes the assistance COBOT are specifically configured and programmed to process the assistance COBOT. The assistance COBOT may include one or more wireless network connections during operation.

In an embodiment, the device that executes the assistance COBOT is COBOT 110. In an embodiment, server 120 is one of several servers that logically cooperated as a cloud or cloud processing environment.

In an embodiment, the assistance COBOT is all of or some combination of: navigation manager 111, voice-assistance agent 112, and/or task agent 113.

At 210, the assistance COBOT navigates a COBOT from an existing location to a destination location based on a condition detected at the destination location.

In an embodiment, at 211, the assistance COBOT navigates the COBOT based on an instruction provided from a remote server that monitors the destination location through real-time images taken of the destination location using the vision behavior manager 121 and the task manager 122.

In an embodiment, at 212, the assistance COBOT navigates the COBOT based on a schedule that triggers the condition.

In an embodiment, at 213, the assistance COBOT navigates the COBOT based on an instruction received through an interface from a remote monitor (operator) that issues the instruction as the condition based on a real-time video feed of the destination location being monitored by the remote monitor.

At 220, the assistance COBOT causes the COBOT to perform a task at the destination location to resolve the condition detected at the destination location.

In an embodiment, at 221, the assistance COBOT causes the COBOT to obtain an item from a shelf and hand the item to a customer located at the destination location for purposes of satisfying the condition.

In an embodiment, at 222, the assistance COBOT causes the COBOT to perform a series of sub tasks relevant to the destination location in performance of the task.

In an embodiment of 222 and at 223, the assistance COBOT causes the COBOT to restock a shelf with items to resolve the condition by navigating the COBOT to a storage area, retrieving the items, transporting the items to the destination location, and restocking the shelf with the items.

In an embodiment, at 230, the assistance COBOT causes the COBOT to interact with a user at the destination location after performance of the task.

In an embodiment of 230 and at 231, the assistance COBOT causes the COBOT to engage the user in a natural-language voice dialogue.

In an embodiment of 230 and at 232, the assistance COBOT causes the COBOT to engage a user through a Graphical User Interface (GUI) presented on a touch-screen display of the COBOT.

In an embodiment, at 240, the assistance COBOT causes the COBOT to traverse to an aisle of a store, determine when items on a shelf require restocking, and restocking the items on the shelf after resolving the condition at the destination location.

Figure 3:
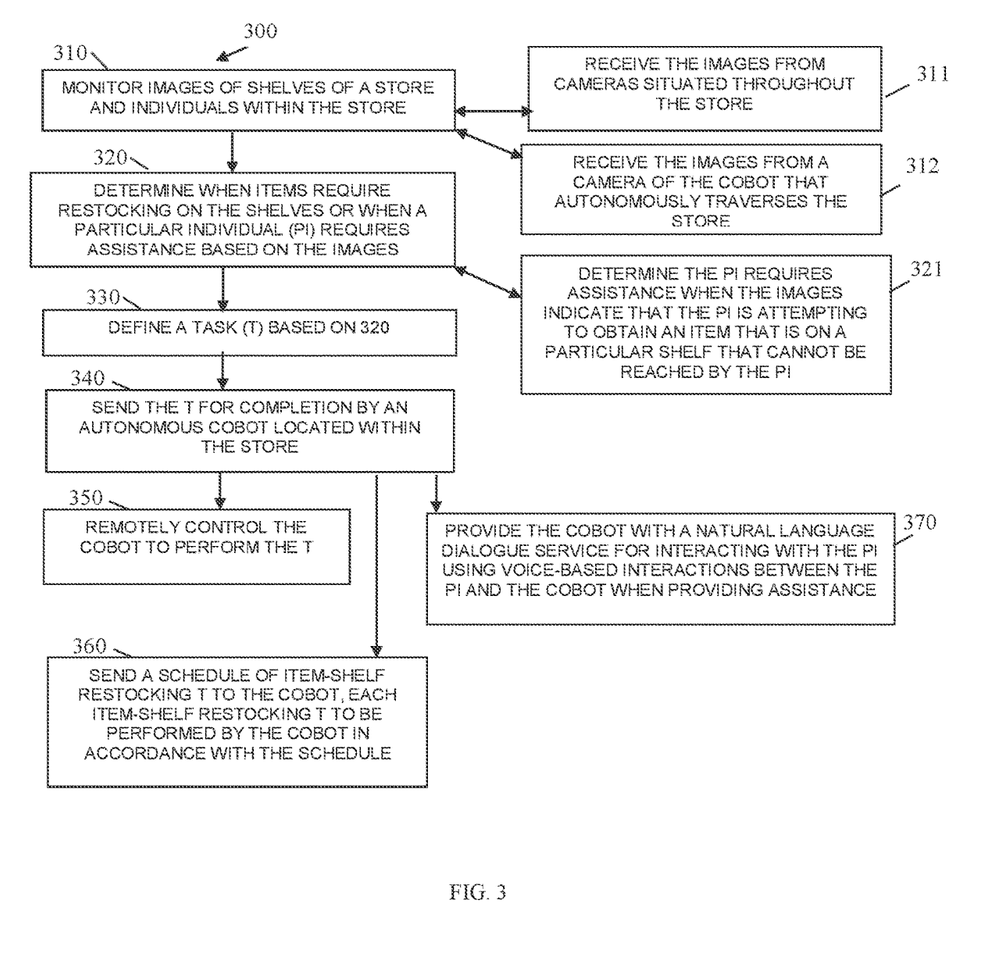
FIG. 3 is a diagram of another method for COBOT assistance, according to an example embodiment.

FIG. 3 is a diagram of another method 300 for COBOT assistance, according to an example embodiment. The software module(s) that implements the method 300 is referred to as a "COBOT controller." The COBOT controller is implemented as executable instructions programmed and residing within memory and/or a non-transitory computer-readable (processor-readable) storage medium and executed by a device. The processors that execute the COBOT controller are specifically configured and programmed to process the COBOT controller. The COBOT controller includes one or more network connections during its processing. Any network connections to the device can be wired, wireless, or a combination of wired and wireless.

In an embodiment, the device that executes the COBOT controller is server 120. In an embodiment, the server 120 is a local server that is physically located within a store. In an embodiment, the server 120 is part of a cloud processing environment (cloud).

In an embodiment, the COBOT controller is all or some combination of vision behavior manager 121, task manager 122, inventory manager 123, and/or voice assistance manager 124.

The processing of the COBOT controller as shown in FIG. 3 represents interaction between server 120 and COBOT 110 (also identified as the method 200 representing processing of COBOT 110).

At 310, the COBOT controller monitors images of shelves of a store and individual within the store.

In an embodiment, at 311, the COBOT controller receives the images from cameras situated throughout the store.

In an embodiment, at 312, the COBOT controller receives the images from a camera of the COBOT that autonomously traverses the store capturing the images.

At 320, the COBOT controller determines when items require restocking on the shelves or when a particular individual requires assistance based on the images.

In an embodiment, at 321, the COBOT controller determines the particular individual requires assistance when the images indicate that the particular individual is attempting to obtain an item that is on a particular shelf that cannot be reached by the particular individual.

At 330, the COBOT controller defines a task that the COBOT is to perform based on 320.

At 340, the COBOT controller sends the task for completion by an autonomous COBOT 110 located within the store.

In an embodiment, at 350, the COBOT controller remotely controls the COBOT to perform the task.

In an embodiment, at 360, the COBOT controller sends a schedule of item-shelf restocking tasks to the COBOT. Each item-shelf restocking task to be performed by the COBOT in accordance with the schedule.

In an embodiment, at 370, the COBOT controller provides the COBOT with a natural-language dialogue service for interacting with the particular individual using voice-based interactions between the particular individual and the COBOT when providing the assistance to the particular individual.

Figure 4:
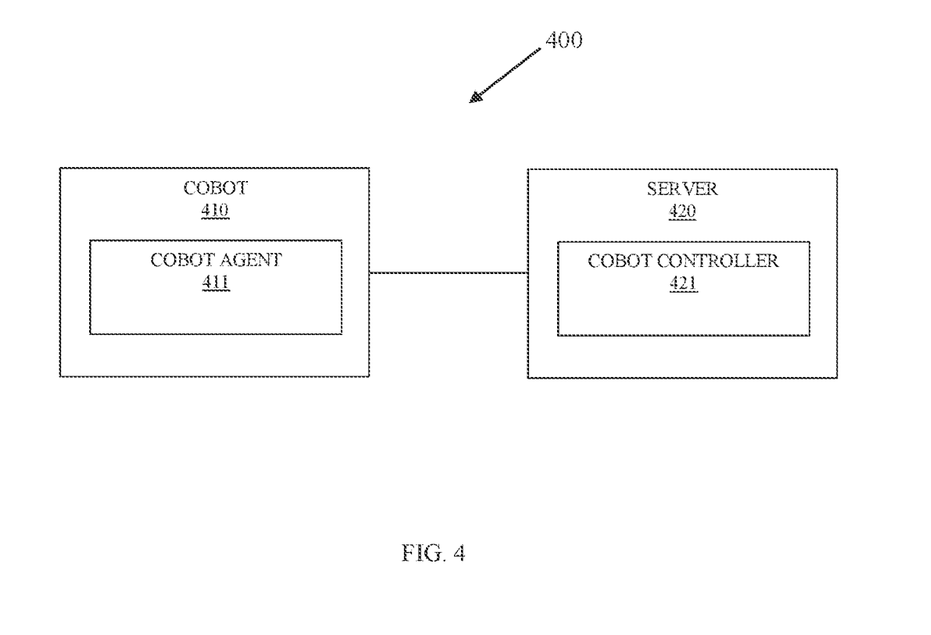
FIG. 4 is a diagram of another system for COBOT assistance, according to an example embodiment.

FIG. 4 illustrates a system 400 for COBOT assistance. The system 400 includes a variety of hardware components configured to execute software components. The system 400 has access to one or more network connections during processing of the software components. The network connections may be wired, wireless, or a combination of both wired and wireless.

In an embodiment, the system 400 is the system 100.

In an embodiment, the system 400 implements, inter alia, the processing discussed above with the FIGS. 1A-1B and 2-3.

The system 400 includes: a COBOT 410 and a server 420.

The COBOT 410 comprising a COBOT processor and a COBOT non-transitory computer-readable storage medium having executable instructions representing a COBOT agent 411.

The COBOT agent 411 when executed by the COBOT processor from the COBOT non-transitory computer-readable storage medium causes the COBOT processor to: 1) autonomously navigate aisles of a store; 2) monitor items on shelves and individuals within the aisles of the store for self-discovered first tasks relevant to item-shelf restocking and providing individual assistance to the individuals; 3) receives second tasks from the COBOT controller 421; and 5) perform the first tasks and the second tasks to restock the items on corresponding shelves within the aisles and to provide item assistance to the individuals.

The COBOT agent 411 when executed by the COBOT processor from the COBOT non-transitory computer-readable storage medium further causes the COBOT processor to: 6) provide natural language assistance to the individuals through voice-based interactions between the COBOT agent and the individuals.

The server 420 comprising a server processor and a server non-transitory computer-readable storage medium having the COBOT controller 421.

The COBOT controller 421 when executed by the server processor from the server non-transitory computer-readable storage medium comprises the server processor to: 1) monitor images of the aisles, the shelves, and individuals; 2) receive first images of the images from the COBOT agent 411; 3) receive second images of the images from cameras situated through the store; 4) determine the second tasks from the first images and the second images; and 5) send the second tasks to the COBOT agent 411 for performance by the autonomous COBOT 410.

In an embodiment, the COBOT 410 is COBOT 110.

In an embodiment, the COBOT agent 411 is all of or some combination of: navigation manager 111, voice assistance agent 112, task agent 113, and/or the method 200 of the FIG. 2.

In an embodiment, server 420 is server 120. In an embodiment, server 120 is one of several servers that logically cooperate within a cloud or cloud processing environment.

In an embodiment, COBOT controller 421 is all of or some combination of: vision behavior manager 121, task manager 122, inventory manager 123, voice assistance manager 124, and/or method 300 of the FIG. 3.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
navigating a Collaborative Robot (COBOT) within a store environment based on real-time image processing and autonomous decision-making capabilities;
wherein the COBOT comprises sensors for environmental interaction and a processor configured to execute navigation instructions while navigating the store environment;
capturing real-time images at a destination location provided by one or more cameras within the store environment;
wherein the real-time images further include images from at least one camera integrated with the COBOT;
wherein the cameras are operatively connected to a remote server to process the real-time images using a set of executable instructions performed by a vision behavior manager and a set of executable instructions performed by a task manager;
wherein both the vision behavior manager and the task manager are executed on the remote server;
monitoring and processing, by the vision behavior manager and the task manager, the real-time images;

detecting or identifying, by the vision behavior manager, a condition at the destination location from the real-time images that are indicative of a need for COBOT assistance;
  wherein the condition is identified based on predefined behavioral patterns of individuals within the store environment;
autonomously navigating the COBOT from an existing location to the destination location upon detecting the condition;
  wherein the navigation is performed based on a set of executable instructions that account for dynamic environmental variables and customer interactions;
associating, by the vision behavior manager or the task manager, the detected or identified condition at the destination with the destination location;
wherein the condition to be detected or identified includes a specific predefined behavior of one or more individuals in the store that indicates that a particular individual needs assistance;
wherein the vision manager:
  tracks the individuals within the store environment from the real-time images:
  tracks items situated within the store environment from the real-time images; and
  tracks the COBOT within the store from the real-time images;
processing rules, by the task manager, to identify each of the behaviors of each of the individuals by matching each of the behaviors for each of the individuals to specific predefined behaviors indicating a need for assistance in obtaining a particular item; and
performing, by the COBOT, a task at the destination location to resolve the condition;
  wherein the task is determined by the task manager on the remote server and is specific to the needs of the store environment and the individuals present;
  wherein the vision behavior manager, or the task manager of the remote server manages additional COBOTs of the store environment.

2. The method of claim 1 further comprising, interacting, by the COBOT, with the particular individual at the destination location after performance of the task based on the particular individual audibly speaking to the COBOT after performance of the task.

3. The method of claim 2, wherein interacting further includes, engaging, by the COBOT, the particular individual using a voice dialogue after the particular individual speaks to the COBOT.

4. The method of claim 2, wherein interacting further includes, interacting, by the COBOT, with the particular individual via a graphical user interface (GUI) presented on a touch-screen display of the COBOT.

5. The method of claim 1 further comprising, traversing, by the COBOT, to an aisle of the store, to determine when at least one additional particular item on a particular shelf require restocking and restocking the particular items on the particular shelf after resolving the condition at the destination location.

6. The method of claim 1, wherein navigating further includes navigating based on an instruction provided from the remote server.

7. The method of claim 1, wherein navigating further includes navigating based on a schedule associated with the condition, wherein the schedule is monitored by the task manager of the remote server.

8. The method of claim 1, wherein navigating further includes navigating based on an instruction received through an interface of the remote server, wherein an operator of the interface provides the instruction for the condition, and wherein the operator also monitors the real-time images of the destination location through the interface.

9. The method of claim 1, wherein performing further includes obtaining, by the COBOT, the particular item from a particular shelf and handing, by the COBOT, the particular item to a customer located at the destination location.

10. The method of claim 1, wherein performing further includes performing, by the COBOT, a series of sub tasks relevant to the destination location in performance of the task.

11. The method of claim 10, wherein performing the series of sub tasks further includes restocking, by the COBOT, a particular shelf with at least one additional particular item to resolve the condition by navigating to a storage area, retrieving the at least one additional particular item, transporting the at least one additional particular item to the destination location, and restocking the particular shelf with the at least one additional particular item.

12. A method, comprising:
receiving, by a set of executable instructions performed by a vision behavior manager and a set of executable instructions performed by a task manager executed on a remote server, real-time images captured of a store environment by cameras associated with the store environment;
  wherein the real-time images depict locations within the store environment;
  wherein the server is remote from the store environment;
monitoring, by the vision behavior manager and the task manager, shelves of the store environment and individuals within the store environment;
tracking, by the vision behavior manager and the task manager, items on the shelves of the store environment, the individuals, behaviors of the individuals based on predefined behaviors, and an autonomous Collaborative Robot (COBOT) within the store environment through depictions of the shelves, the items on the shelves, the individuals, the behaviors of the individuals, and the autonomous COBOT within the store environment through the real-time images;
  wherein monitoring further includes processing rules associated with the predefined behaviors to identify each of the behaviors for each of the individuals by matching each of the behaviors for each of the individuals to a specific predefined behavior;
  wherein the vision behavior manager identifies a particular behavior of a particular individual as an indication that the particular individual needs assistance in obtaining a particular item based on the particular behavior and without the particular individual requesting the particular item;
determining, by the task manager, when specific items require restocking on the shelves or when the particular individual requires assistance based on the real-time images;
  wherein the determination is made without the particular individual explicitly requesting assistance;
defining, by the task manager, a task based on the determination, wherein the task includes autonomous navigation and item handling by the COBOT;
sending, by the task manager, the task for completion by the COBOT located within the store environment, wherein the COBOT is configured to perform the task based on real-time analysis and autonomous decision-making capabilities; and iterating the monitoring of the shelves and the individuals, by the vision behavior manager and the task manager, and providing additional tasks for additional COBOTs of the store based on an analysis of the real-time images for the store environment.

13. The method of claim 12, wherein determining further includes determining the particular individual requires assistance when the real-time images indicate that the particular individual is attempting to obtain the particular item that is on a particular shelf that cannot be reached by the particular individual.

14. The method of claim 12 further comprising, remotely controlling, by the task manager, the autonomous COBOT to perform the task.

15. The method of claim 12 further comprising, sending, by the task manager, a schedule of item-shelf restocking tasks to the autonomous COBOT, each item-shelf restocking task to be performed by the autonomous COBOT in accordance with the schedule.

16. The method of claim 12 further comprising, providing, through a set of executable instructions performed by a voice assistance manager that execute on the server, the autonomous COBOT with a natural language dialogue service for interacting with the particular individual using voice-based interactions between the certain individual and the COBOT when the COBOT provides assistance to the particular individual.

17. A system, comprising:
an autonomous Collaborative Robot (COBOT) comprising a COBOT processor and a COBOT non-transitory computer-readable storage medium having executable instructions representing a COBOT agent;

a server comprising a server processor and a server non-transitory computer-readable storage medium having executable instructions representing a COBOT controller;

the COBOT agent when executed by the COBOT processor causes the COBOT to:
autonomously navigate aisles of a store;
monitor items on shelves and individuals within the aisles for self-discovered tasks relevant to item-shelf restocking and providing individual assistance;
receive tasks from the COBOT controller; and
perform the tasks based on real-time environmental analysis and autonomous decision making;

the COBOT controller when executed by the server processor causes the server to:
monitor images of the aisles, shelves, and individuals;
receive images from the COBOT agent;
determine tasks from the images;
send the tasks to the COBOT agent for performance by the autonomous COBOT; and
process rules associated with predefined behaviors to identify each of a plurality of behaviors for each of the individuals by matching each of the behaviors for each of the individuals to a specific predefined behavior;
wherein the tasks are iteratively refined based on ongoing real-time image analysis and predefined behavioral patterns indicative of assistance needs of the individuals within the store environment.

18. The system of claim 17, wherein the COBOT agent when executed by the COBOT processor from the COBOT non-transitory computer-readable storage medium further causes the COBOT processor to: provide natural language assistance to the individuals through voice-based interactions between the COBOT agent and the individuals.

* * * * *